(12) United States Patent
Melnichuk et al.

(10) Patent No.: US 12,474,413 B1
(45) Date of Patent: Nov. 18, 2025

(54) CALIBRATION DEVICE FOR AC/DC SYSTEMS

(71) Applicant: National Technology & Engineering Solutions of Sandia, LLC, Albuquerque, NM (US)

(72) Inventors: Anna Melnichuk, Rio Rancho, NM (US); Aaron Michael Meyrick, Rio Rancho, NM (US)

(73) Assignee: National Technology & Engineering Solutions of Sandia, LLC, Albuquerque, NM (US)

( * ) Notice: Subject to any disclaimer, the term of this patent is extended or adjusted under 35 U.S.C. 154(b) by 211 days.

(21) Appl. No.: 18/370,532

(22) Filed: Sep. 20, 2023

(51) Int. Cl.
  *G01R 31/40* (2020.01)
  *H01P 5/18* (2006.01)

(52) U.S. Cl.
  CPC .............. *G01R 31/40* (2013.01); *H01P 5/18* (2013.01)

(58) Field of Classification Search
  CPC ............................. G01R 31/40; H01P 5/18
  USPC ..................... 324/764.01, 537, 500
  See application file for complete search history.

(56) References Cited

U.S. PATENT DOCUMENTS

| 12,051,844 B1 * | 7/2024 | Tsironis .................... H01P 5/04 |
| 12,206,154 B2 * | 1/2025 | Sarkar ..................... H01P 5/187 |
| 2019/0348961 A1 * | 11/2019 | Lim ......................... H03H 7/18 |

OTHER PUBLICATIONS

Po Dong et al., "Wavelength-tunable silicon microring modulator"; Received Feb. 12, 2010; revised May 3, 2010; accepted May 4, 2010; published May 10, 2010; May 24, 2010 / vol. 18, No. 11 / Optics Express 10941.

Tingyi Gu et al., "Molecular-absorption-induced thermal bistability in PECVD silicon nitride microring resonators"; Received Jun. 2, 2014; revised Jul. 7, 2014; accepted Jul. 11, 2014; published Jul. 22, 2014; Jul. 28, 2014 | vol. 22, No. 15 DOI:10.1364/OE.22.018412 | Optics Express 18412.

* cited by examiner

*Primary Examiner* — Giovanni Astacio-Oquendo
(74) *Attorney, Agent, or Firm* — Eschweiler & Potashnik, LLC; Samantha Updegraff

(57) ABSTRACT

The present disclosure relates to calibration devices for alternating current (AC) and direct current (DC) systems. The calibration device includes a circuit with a first reference (ref1) sensor that has a ref1 input and a ref1 output. The circuit has a first device under test (DUT1) sensor with a DUT1 input and a DUT1 output. The circuit has a coupler, where the ref1 output and the DUT1 output are connected to a first input and a second input of the coupler respectively and the coupler has a coupler output. A ref1 heating element is adjacent to and electrically isolated from the ref1 sensor and a DUT1 heating element is adjacent to and electrically isolated from the DUT1 sensor. A ref1 power source is connected to the ref1 heating element, and a DUT1 power source is connected to the DUT1 heating element.

20 Claims, 6 Drawing Sheets

CALIBRATION DEVICE FOR AC/DC SYSTEMS

STATEMENT REGARDING FEDERALLY SPONSORED RESEARCH OR DEVELOPMENT

This invention was developed under Contract No. DE-NA0003525 awarded by the United States Department of Energy/National Nuclear Security Administration to National Technology & Engineering Solutions of Sandia, LLC, operator of Sandia National Laboratories. The Government has certain rights in this invention.

FIELD

This application generally relates to calibration devices for calibrating direct current (DC) or alternating current (AC) power supplies, in particular, by means of electrical sensors.

BACKGROUND

Power calibration devices can be configured with a reference power source and a device under test (DUT) power source. Electrical properties (e.g., voltage and or current) of the reference power source are directly or indirectly measured and compared with a direct or indirect measurement of electrical properties of the DUT power source. Based on the measurement comparison, it can be determined if the DUT power source outputs power that is calibrated, and if the output power of the DUT power source is un-calibrated, adjustments to the DUT power source can be performed. Power calibration is used in a variety of applications to realize stable electronic operation of modern day devices.

SUMMARY

The technology described herein relates to calibration devices for alternating current (AC) and direct current (DC) systems.

In some aspects, the technology described herein relates to a circuit with a first reference (ref1) sensor that has a ref1 input and a ref1 output. The circuit has a first device under test (DUT1) sensor with a DUT1 input and a DUT1 output. The circuit has a coupler, where the ref1 output and the DUT1 output are connected to a first input and a second input of the coupler respectively and the coupler has a coupler output. A ref1 heating element is adjacent to and electrically isolated from the ref1 sensor and a DUT1 heating element is adjacent to and electrically isolated from the DUT1 sensor. A ref1 power source is connected to the ref1 heating element, and a DUT1 power source is connected to the DUT1 heating element.

In some aspects, the technology described herein relates to a circuit with a first reference (ref1) optical ring resonator laterally offset from a ref1 waveguide bus where the ref1 waveguide bus has a ref1 input separated from a ref1 output by the ref1 optical ring resonator. The circuit includes a second reference (ref2) optical ring resonator laterally offset from a ref2 waveguide bus where the ref2 waveguide bus has a ref2 input separated from a ref2 output by the ref2 optical ring resonator. A ref1 heating element is adjacent to the ref1 optical ring resonator. A ref2 heating element is adjacent to the ref2 optical ring resonator. A ref1 power source is connected to the ref1 heating element. The circuit further includes an analysis circuitry where the ref1 output and the ref2 output are connected to the analysis circuitry.

In some aspects, the technology described herein relates to a circuit with a first reference (ref1) sensor, a second reference (ref2) sensor, and a first device under test (DUT1) sensor. A ref1 resistive element surrounds a portion of the ref1 sensor. A ref2 resistive element surrounds a portion of the ref2 sensor. A DUT1 resistive element surrounds a portion of the DUT1 sensor. A ref1 power source is connected to the ref1 resistive element. A DUT1 power source is connected to the DUT1 resistive element. The circuit includes an analysis circuitry, where the ref1 sensor, ref2 sensor, and DUT1 sensor are connected to the analysis circuitry and wherein the ref1 sensor, the ref2 sensor, and the DUT1 sensor are electrically isolated from the ref1 power source and the DUT1 power source.

DETAILED DESCRIPTION

Figure 1:
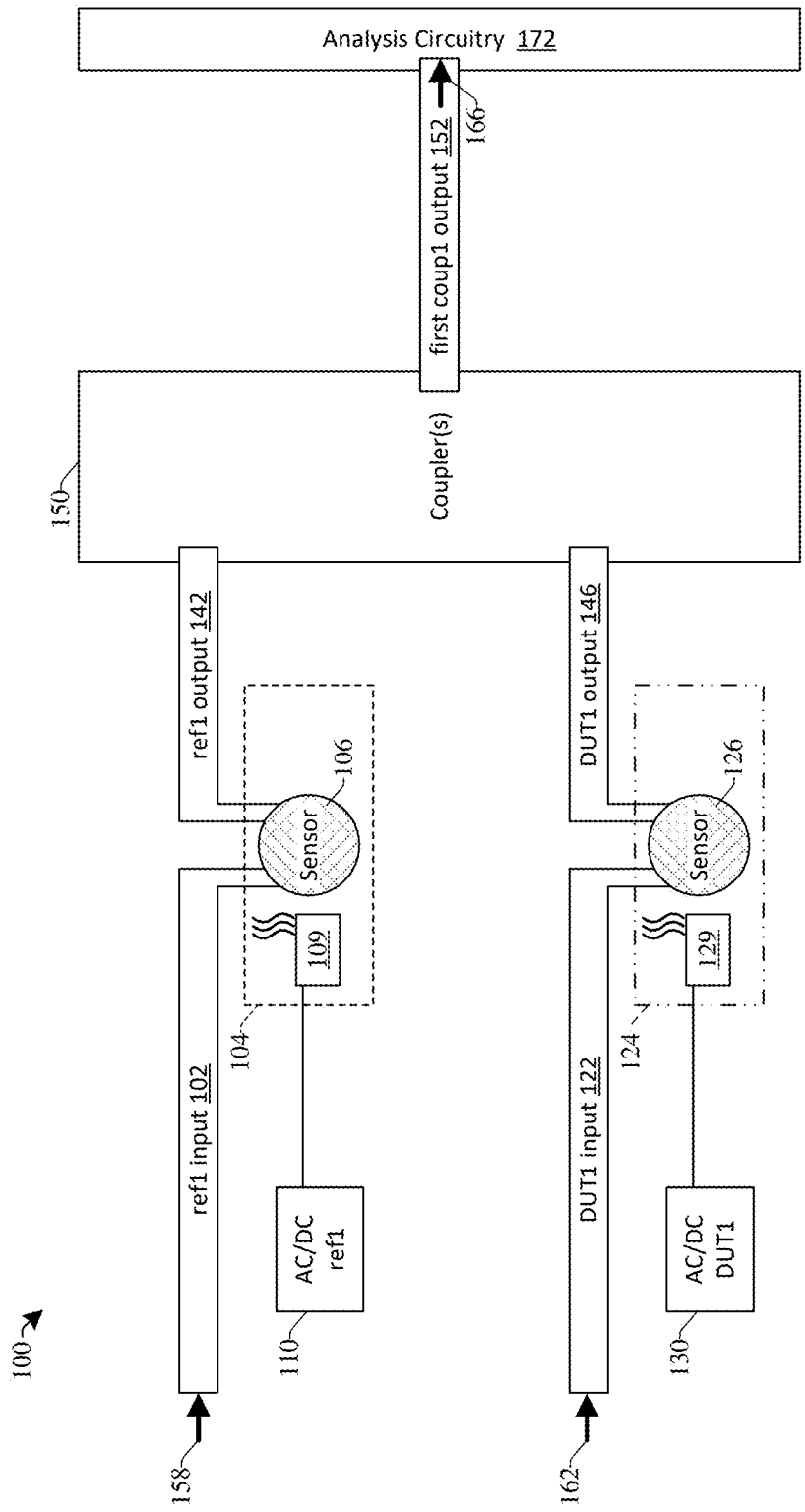
FIG. 1 illustrates a diagram of a circuit with a first reference (ref1) power source and a first device under test (DUT1) power source.

Power calibration devices are designed to measure electrical properties of a device under test (DUT) power source and determine if the electrical properties are within a range of calibration. Some power calibration techniques include thermal voltage or current calibration (also referred to as thermal electric calibration). For example, electrical properties of the DUT power source and a reference power source are determined by thermal couplers. The reference power source is connected to a reference thermal coupler to generate heat based on the power supplied by the reference power source. The DUT power source is connected to a DUT thermal coupler to generate heat based on the power supplied by the DUT power source. The heat generated on the reference and DUT thermal couplers are measured and input to a comparator to determine the difference in heat generated by the thermal couplers. The voltage or current of the DUT power source can be adjusted to generate heat that is identical or substantially the same to heat generated by the reference power source in order to calibrate the DUT power source to the reference power source.

Existing thermal electric calibration devices can be limited by electrical cross talk. For example, if the reference power source is a direct current (DC) power source and the DUT power source is an alternating current (AC) power source, the AC can generate cross talk through the calibration circuit with the DC and generate uncertainty within the measurement system. As such, the measurement range and accuracy can be diminished.

The present disclosure, in some embodiments, relates to a circuit that provides for thermal electric calibration where the reference power source and the DUT power source are electrically decoupled from a measurement circuit. For example, the circuit includes a reference power source connected to a reference heating element and a DUT power source connected to a DUT heating element. The reference heating element is adjacent to a reference sensor and the DUT heating element is adjacent to a DUT sensor. The reference and DUT sensors are configured to detect a change in temperature within a temperature gradient region related to the heating elements respectively. The sensors are electrically decoupled from the heating elements to eliminate cross talk from the power sources. The reference and DUT sensors have inputs that receive respective signals that can be, for example, an optical signal, a radio frequency (RF) signal. The sensors detect a change in temperature from the heating elements resulting in a frequency shift of the signals. The signals are output from the sensors and measured to determine the calibration status of the DUT power source.

For example, the signals can be photonic and the reference and DUT sensors can be photonic ring couplers formed from a dielectric waveguide material that is sensitive to temperature changes. In some embodiments, the photonic ring couplers are formed from silicon nitride which can provide a desirable balance between optical loss and temperature response (sensitivity). The heat from the reference and DUT heating elements can cause deformation of the dielectric material resulting in a geometric change of the photonic ring couplers thereby shifting the frequency of the signals. The relative frequency shift of the signals are used to determine the calibration of the DUT power source relative to the reference power source. Since the sensors are electrically decoupled from the first and second heating elements, cross-talk in the measurement circuitry from the DUT power source and the reference power source is eliminated and the circuit can provide a wide range in power calibration that is highly precise. In some embodiments, the circuit can realize approximately 1 microvolt of uncertainty at a measurement frequency.

FIG. 1 illustrates a diagram of a circuit 100 with a first reference power source, and a first device under test (DUT1) power source.

Circuit 100 includes a first reference (ref1) sensor 106 with a ref1 input 102 and a ref1 output 142. The ref1 sensor 106 receives a ref1 signal 158 at the ref1 input 102. The circuit 100 further includes a first device under test (DUT1) 126 sensor with a DUT1 input 122 and a DUT1 output 146. The DUT1 sensor 126 receives a DUT1 signal 162 at the DUT1 input 122.

The circuit 100 further includes a coupler 150 where the ref1 output 142 and the DUT1 output 146 are connected to a first input and a second input of the coupler 150 respectively. The coupler 150 has a first coupler (coup1) output 152 (first coup1 output 152). A ref1 heating element 109 is adjacent to the ref1 sensor 106 and a DUT1 heating element 129 is adjacent to the DUT1 sensor 126. A ref1 power source 110 is connected to the ref1 heating element 109 and a DUT1 power source 130 is connected to the DUT1 heating element 129. The first coup1 output 152 is connected to analysis circuitry 172. The first coup1 output 152 provides an output signal (also referred to as first coup1 signal 166) to the analysis circuitry 172 to determine the calibration state of the DUT1 power source 130. In some embodiments the ref1 power source 110 and the DUT1 power source 130 are referred to as power supplies. The analysis circuitry 172 may comprise one or more processors coupled to memory. The one or more processors can include instructions, that when executed, cause the analysis circuitry 172 to perform calibration procedures associated with determining the calibration state of one or more DUT power sources. The results of calibration procedures can be stored in the memory and used for analysis and calibration determinations.

The ref1 sensor 106 detects changes in temperature from the ref1 heating element 109 and the DUT1 sensor 126 detects changes in temperature from the DUT1 heating element 129. These detections occur under various test conditions and are used to assess the electrical calibration characteristics of the DUT1 power source 130 in comparison to the ref1 power source 110. Furthermore, the ref1 heating element 109 is electrically isolated from the ref1 sensor 106 and the DUT1 heating element 129 is electrically isolated from the DUT1 sensor 126. Thus, the sensors detect changes in temperature from the heating elements passively. That is, the sensors detect temperature changes within a temperature gradient region that is thermally coupled between the heating elements and the sensors while the heating elements and sensors are electrically decoupled from one another. For example, the ref1 sensor 106 detects temperature changes within a ref1 temperature gradient region 104 which can realize temperature fluctuations caused by the ref1 heating element 109. Likewise, the DUT1 sensor 126 detects temperature changes within a DUT1 temperature gradient region 124 which can realize temperature fluctuations caused by the DUT1 heating element 129.

The sensors (i.e., ref1 sensor 106 and DUT1 sensor 126) can detect changes in temperature a number of ways. In some embodiments, the sensors are photonic sensors or cavity resonators formed from a dielectric material (e.g., silicon nitride). As the heating elements changes the temperature in the temperature gradient regions, the lattice structure of the dielectric material can change, thereby shifting the frequency of photonic signals (i.e., ref1 signal 158 and DUT1 signal 162) in the photonic sensors. Photonic ring resonators are discussed in further detail in conjunction with FIGS. 3-6. In other embodiments, the sensors can be radio frequency (RF) sensors or microwave sensors, such as an RF resonator or RF cavity resonator. The RF sensors can be disposed on a material that is sensitive to temperature changes such as FR-4, polytetrafluoroethylene, ceramics, ferrites, polymers, or other dielectric materials. When the temperature sensitive material undergoes a temperature change from the heating elements, the geometric structure of the temperature sensitive material can change or other electrical properties such as permittivity or permeability can change which result in frequency shifts of an RF signal (i.e., ref1 signal 158 and DUT1 signal 162) transmitted through the RF sensor.

In yet other embodiments, the sensors can be a light source such as a laser or a quantum dot or a photonic crystal that generates phonons. The crystalline structure of the laser or quantum dot can shift the frequency of light detected by the dot or change the vibration of phonons of the photonic crystal as a result of temperature changes due to the heating elements. For example, the bandgap of material associated with the laser (e.g., for an indium gallium arsenide quantum well type laser) through heating which shifts the laser's frequency. Additionally or alternatively the grating cavity around the laser can undergo a temperature change which would shift the laser's frequency. In other examples, cladding of the photonic crystal resonator can undergo a temperature change resulting in a change in frequency. Various other means can be implemented that result in a change in signal due to the heating elements while maintaining electrical isolation from the power sources (i.e., ref1 power source 110 and DUT1 power source 130). In yet other embodiments, the heating elements can be replaced with piezoelectric elements that, when powered by power sources, induce deformation or strain to the substrate and associated sensors. The sensors can be configured to detect the deformation induced by the piezoelectric elements thereby detecting changes in electrical characteristics of the power sources.

While the ref1 sensor 106 is thermally coupled to the ref1 heating element 109 and the DUT1 sensor 126 is thermally coupled to the DUT1 heating element 129, the ref1 sensor 106 is substantially thermally decoupled from the DUT1 sensor 126. The heating elements are placed close to the sensors, and sensors are separated far enough from one another such that respective sensors detect a change in temperature from an associated heating element. As such, the ref1 sensor 106 is thermally decoupled from the DUT1 sensor 126 and the DUT1 heating element 129. Likewise, the DUT1 sensor 126 is thermally decoupled from the ref1 sensor 106 and the ref1 heating element 109. In some embodiments, sensors are thermally decoupled from other devices with a separation distance of 100 micrometer to 200 micrometer or more and may, in some examples, include isolation features such as isolation trenches and/or material barriers. In some embodiments, the amount of thermal decoupling or thermal isolation is selected based on a desired range of resolution and achieved by depositing alloys and adjusting the doping levels of circuit components accordingly.

In some embodiments, the ref1 sensor 106 and the DUT1 sensor 126 are identical or substantially the same geometry. Similarly, the ref1 heating element 109 and the DUT1 heating element 129 are identical or substantially the same geometry. As such, frequency or amplitude shifting of the DUT1 signal 162 through the DUT1 sensor 126 is the same or substantially the same as the frequency or amplitude shifting of the ref1 signal 158 through the ref1 sensor 106 when the heating characteristics of the ref1 heating element 109 and the DUT1 heating element 129 are the same or substantially the same.

In some embodiments, the ref1 power source 110 is a DC power source and the DUT1 power source 130 is an AC power source. It is understood that the ref1 power source 110 and the DUT1 power source 130 can be either an AC power source or a DC power source depending on the application. As such, a reference AC or DC power source can be used to calibrate a device under test AC or DC power source.

As described previously, the ref1 signal 158 and DUT1 signal 162 can undergo a shift in frequency, for example, frequency of light, or RF signal. The ref1 signal 158 is output from the ref1 sensor 106 at the ref1 output 142 and connected to the first input of the coupler 150. Likewise, the DUT1 signal 162 is output from the DUT1 sensor 126 at the DUT1 output 146 and connected to the second input of the coupler 150. While FIG. 1 illustrates the coupler 150 as a single coupler with two input ports, it is understood that coupler 150 can have more than two input ports or the circuit can include more than one coupler. Coupler 150 provides a first coup1 signal 166 which is a sampling of the ref1 signal 158 and the DUT1 signal 162 at the first coup1 output 152. The first coup1 output 152 is connected to analysis circuitry 172 and provides the first coup1 signal 166 to the analysis circuitry 172. The analysis circuitry 172 can compare the ref1 signal 158 and the DUT1 signal 162 components of the first coup1 signal 166. For example, if the DUT1 signal 162 component is at the same amplitude and/or frequency as the ref1 signal 158 component, then the analysis circuitry 172 may determine that electrical properties of the DUT1 130 power source are the same as the electrical properties of the ref1 power source 110. Since the ref1 sensor 106 and the DUT1 sensor 126 are electrically decoupled from the ref1 power source 110 and the DUT1 power source 130, crosstalk within the coupler 150 and between the ref1 sensor 106 and the DUT1 sensor 126 is low or essentially zero. As such, the circuit realizes high precision electrical measurements of the ref1 power source 110 and the DUT1 power source 130.

Figure 2:
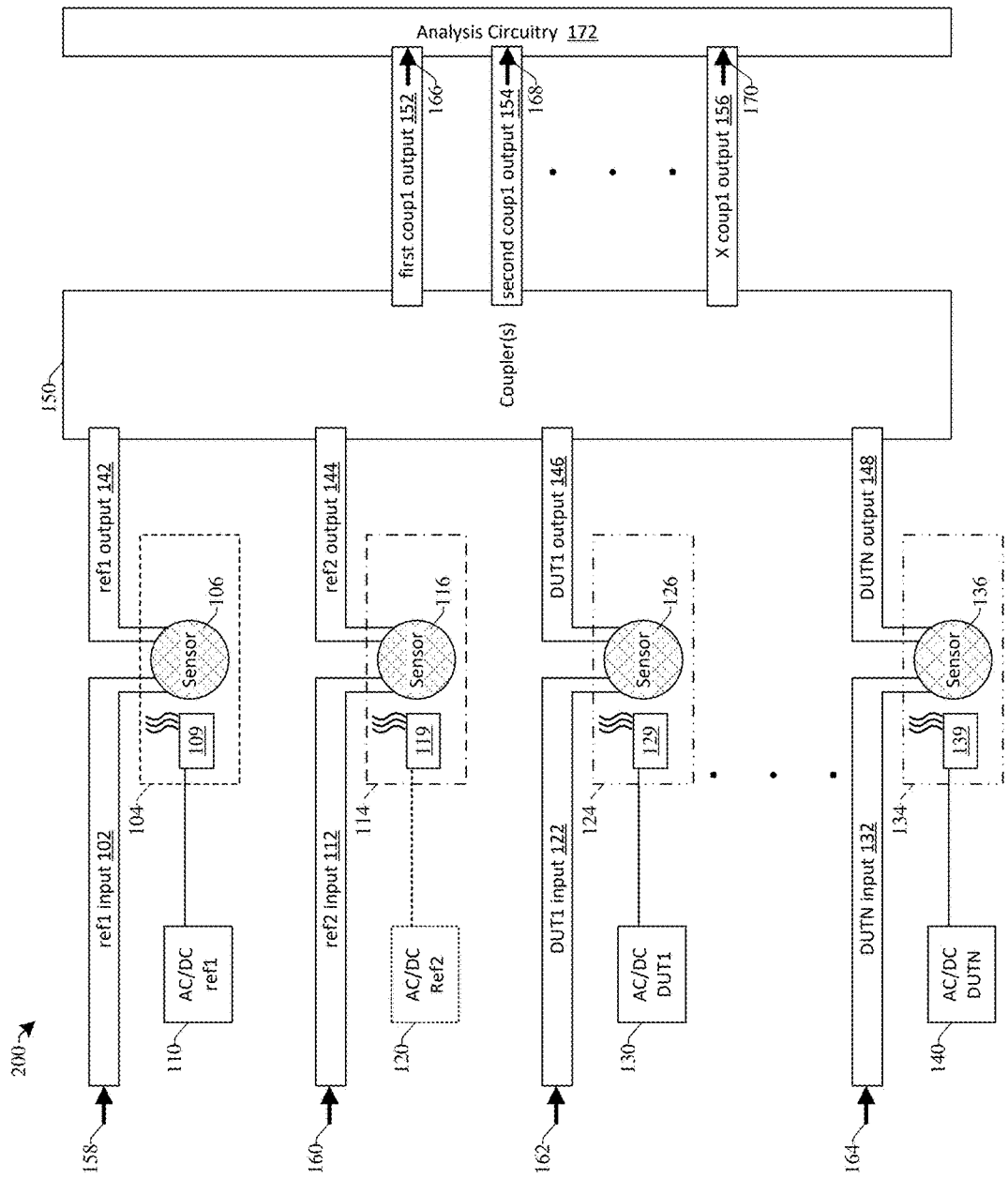
FIG. 2 illustrates a diagram of a circuit with a ref1 power source and a plurality of device under test (DUT) power sources.

FIG. 2 illustrates a diagram of a circuit 200 with a first reference power source, a second reference power source, and a plurality of device under test (DUT) power sources.

Circuit 200 shows additional embodiments relative to circuit 100. Circuit 200 illustrates a second reference (ref2) sensor 116, with a ref2 input 112 and a ref2 output 144. The ref2 sensor 116 receives a ref2 signal 160 at the ref2 input 112. A ref2 heating element 119 is adjacent to the ref2 sensor 116 and a ref2 power source 120 is connected to the ref2 heating element 119. The ref2 output 144 is connected to the coupler 150. The ref2 sensor 116 detects changes in temperature from the ref2 power source 120 according to aspects described in conjunction with the sensors, power sources, and heating elements of circuit 100 of FIG. 1. As such, ref2 sensor 116 detects temperature changes within a ref2 temperature gradient region 114 that realizes temperature changes from the ref2 heating element 119.

The circuit 200 further illustrates a plurality of DUT power sources and associated measurement circuitry. As such, in addition to the DUT1 power source 130, a number of additional DUT power sources and associated measurement circuitry can be connected to the coupler 150. Circuit 200 illustrates the additional DUT circuitry with up to N DUT power sources and circuitry where N is a selected number of DUT devices. For example, circuit 200 includes an N device under test (DUTN) sensor 136, with a DUTN input 132 and a DUTN output 148. The DUTN sensor 136 receives a DUTN signal 164 at the DUTN input 132. A DUTN heating element 139 is adjacent to the DUTN sensor 136 and a DUTN power source 140 is connected to the DUTN heating element 139. The DUTN output 148 is connected to the coupler 150. The DUTN sensor 136 detects changes in temperature from the DUTN power source 140 according to aspects described in conjunction with the sensors, heating elements, and power sources of circuit 100 of FIG. 1. As such, DUTN sensor 136 detects temperature changes within a DUTN temperature gradient region 134 that realizes temperature changes from the DUTN heating element 139.

The ref2 output 144 and the DUTN output 148 are connected to the coupler 150 and provide the ref2 signal 160 and the DUTN signal 164 respectively to the coupler 150. As described previously, the coupler 150 can have multiple coupling inputs, or comprise multiple couplers. The coupler 150 can provide outputs in addition to first coup1 output 152. For example, coupler 150 can provide second coup1 output 154 and additional outputs depending on the number of devices connected to coupler 150, and up to X outputs represented by X coup1 output 156. The output signals of coupler 150 include a sampling of the coupler 150 inputs. For example, first coup1 signal 166, second coup1 signal 168, and X coup1 signal 170 can include a sampling of ref1 signal 158, ref2 signal 160, DUT1 signal 162, and DUTN signal 164. In some examples, the outputs of coupler 150 provide different power levels of the output signals. For example, first coup1 signal 166 at first coup1 output 152 can comprise a 90% power sampling of the input signals (i.e., ref1 signal 158, ref2 signal 160, DUT1 signal 162, and DUTN signal 164). The second coup1 signal 168 at the second coup1 output 154 can comprise a 5% power sampling of the input signals and X coup1 signal 170 at X coup1 output 156 can comprise a 5% power sampling of the input signals. However, this is just an example and it is understood that the coupler 150 outputs can provide signals at different percentages of power sampling.

In some embodiments, the ref2 power source 120 is a DC power source and the DUT1 power source 130 and the DUTN power source 140 are AC power sources. It is understood that the ref1 power source 110, the ref2 power source 120, the DUT1 power source 130, and the DUTN power source 140 can be either an AC power source or a DC power source depending on the application. As such, one or more reference AC or DC power sources can be used to calibrate one or more device under test AC or DC power source.

The ref2 sensor 116 can provide additional calibration capability for the circuit 200. For example, the ref2 sensor 116 can provide another reference power source, such as ref2 power source 120, for calibration comparison. Or in other examples, the ref2 power source 120 can be omitted and the ref2 sensor 116 can provide a reference signal measurement of the self-heating within the ref2 temperature gradient region 114 from the ref2 signal 160 transmitted through the ref2 sensor 116. In this example, the ref2 signal 160 heats up the ref2 sensor 116 and/or ref2 heating element 119, and the self-heating of ref2 sensor 116 causes a frequency shift of the ref2 signal 160 that can be used for diagnostic and calibration purposes by the analysis circuitry 172. For example, ref2 sensor 116 can be used to determine the detuning of the ref2 sensor 116 without external heating and can provide insight into manufacturing differences for different sensors within the circuit 200. The other sensors and heating elements can be configured for similar measurements to determine self-heating characteristics.

The ref2 sensor 116 and the DUTN sensor 136 exhibit similar electrical and thermal isolation as described in conjunction with ref1 sensor 106 and DUT1 sensor 126. That is, the sensors (i.e., ref1 sensor 106, ref2 sensor 116, DUT1 sensor 126, and DUTN sensor 136) are electrically decoupled from the power sources (i.e., ref1 power source 110, ref2 power source 120, DUT1 power source 130, and DUTN power source 140). The ref2 sensor 116 is thermally coupled to the ref2 heating element 119 within the temperature gradient region 114 and thermally decoupled (i.e., substantially thermally decoupled) or isolated from the ref1 heating element 109, the DUT1 heating element 129, the DUTN heating element 139, the ref1 sensor 106, the DUT1 sensor 126, and the DUTN sensor 136. The DUTN sensor 136 is thermally coupled to the DUTN heating element 139 within a DUTN temperature gradient region 134 and thermally decoupled (i.e., substantially thermally decoupled) or isolated from the ref1 heating element 109, ref2 heating element 119, the DUT1 heating element 129, the ref1 sensor 106, the ref2 sensor 116, and the DUT1 sensor 126.

Inclusion of additional DUT power sources and associated circuitry, for example, DUTN power source 140, provides the circuit 200 with the capability to calibrate multiple different DUT power sources in conjunction with DUT1 power source 130.

One or more of the first coup1 output 152, second coup1 output 154, or X coup1 output 156 is connected to analysis circuitry 172 and provides one or more of the first coup1 signal 166, second coup1 signal 168, or X coup1 signal 170 (also referred to collectively as output signals) to the analysis circuitry 172. The analysis circuitry 172 can perform calibration operations on one or more of the output signals to determine that the calibration state of the DUT power sources. Since the sensors are electrically isolated from the power sources, cross talk within the coupler 150 and between the sensors is low or essentially zero. As such, the circuit 200 realizes high precision electrical measurements of the power sources. For example, in some embodiments, the circuit 200 can realize an uncertainty of 0.5 parts per million (ppm) to 2 ppm across a measurement frequency range. In some embodiments, the uncertainty is 0.5 ppm to 10 ppm across the measurement frequency range. In some embodiments, the uncertainty is approximately 1 ppm (i.e., 1 microvolt of uncertainty).

Figure 3:
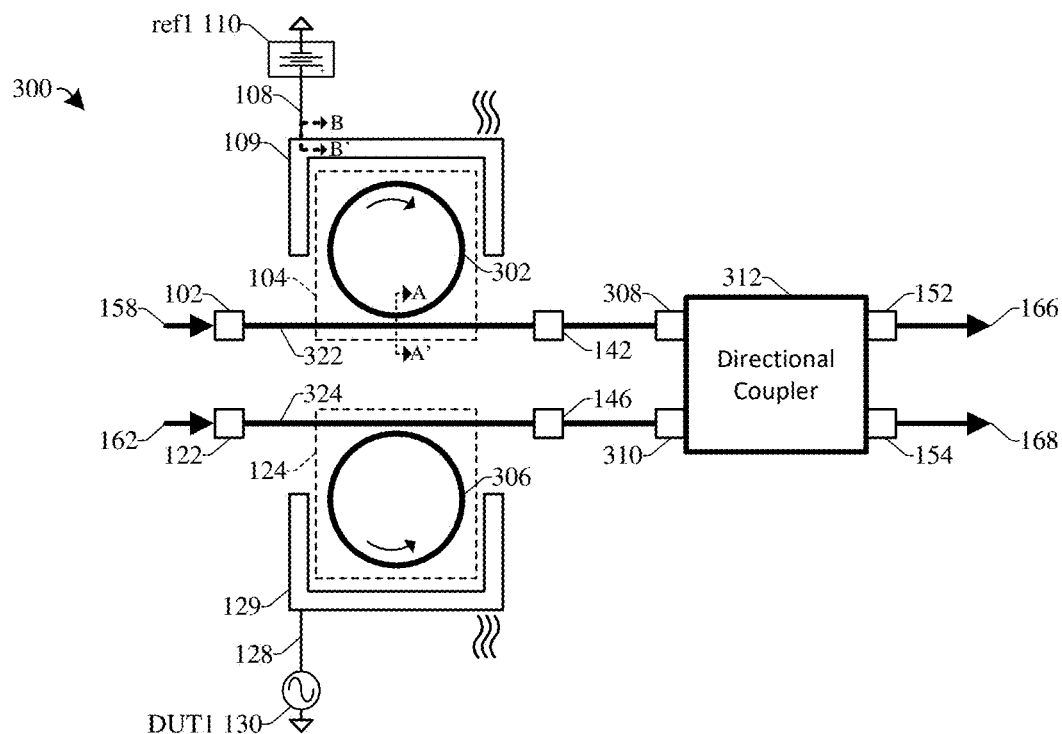
FIG. 3 illustrates a diagram of a circuit with a ref1 optical ring resonator associated with a ref1 power source and a DUT1 optical ring resonator associated with a DUT1 power source.

FIG. 3 illustrates a diagram of a circuit 300 with a first reference (ref1) optical ring resonator associated with a ref1 power source and a first device under test (DUT1) optical ring resonator associated with a DUT1 power source.

Circuit 300 shows alternative embodiments relative to circuit 100 where aspects of circuit 300 are described in reference to an optical or photonic implementation of circuit 100. Circuit 300 illustrates a ref1 optical ring resonator 302 laterally offset from a ref1 waveguide bus 322. In some embodiments, the ref1 optical ring resonator 302 is analogous to the ref1 sensor 106 of FIGS. 1 and 2. The ref1 waveguide bus has a ref1 input 102 separated from a ref1 output 142 by the ref1 optical ring resonator 302. The ref1 optical ring resonator 302 receives a ref1 signal 158 by the ref1 input 102.

The circuit 300 also shows a DUT1 optical ring resonator 306 laterally offset from a DUT1 waveguide bus 324. In some embodiments, the DUT1 optical ring resonator 306 is analogous to the DUT1 sensor 126 of FIGS. 1 and 2. DUT1 waveguide bus 324 has a DUT1 input 122 separated from a DUT1 output 146 by the DUT1 optical ring resonator. The DUT1 optical ring resonator 306 receives a DUT1 signal 162 by the DUT1 input 122.

A ref1 heating element 109 is adjacent to the ref1 optical ring resonator 302 and a DUT1 heating element 129 is adjacent to the DUT1 optical ring resonator 306. A ref1 power source 110 is connected to the ref1 heating element 109 by a wire 108 or other means of connection. A DUT1 power source 130 is connected to the DUT1 heating element 129 by a wire 128 or other means of connection. As discussed in accordance with FIGS. 1 and 2, the ref1 power source 110 can be a DC power source and the DUT1 power source 130 can be an AC power source. In other embodiments, the ref1 power source 110 and the DUT1 power source 130 can be an AC or a DC power source. As shown in circuit 300, the ref1 heating element 109 surrounds a portion of the ref1 optical ring resonator 302 and the DUT1 heating element 129 surrounds a portion of the DUT1 optical ring resonator 306. Thus, the heating elements are electrically decoupled from the waveguide busses and ring resonators.

The ref1 optical ring resonator 302 is optically coupled to the ref1 waveguide bus 322 and the DUT1 optical ring resonator 306 is optically coupled to the DUT1 waveguide bus 324. That is, the ref1 optical ring resonator 302 and the DUT1 optical ring resonator 306 (collectively referred to as ring resonators) can be physically separated from the ref1 waveguide bus 322 and the DUT1 waveguide bus 324 (collectively referred to as waveguide buses) and the ring resonators are close enough to the waveguide busses to couple optical or photonic energy from the waveguide busses to the ring resonators. For example, the circuit 300 can be formed over a semiconductor substrate or within a silicon on insulator (SOI) substrate. The ring resonators and waveguides can optically couple through a dielectric medium disposed between the ring resonators and waveguides.

The optical coupling between the waveguide busses and the ring resonators can occur through one of several mechanisms. For example, evanescent coupling where the waveguide busses and ring resonators are placed in close proximity with physical separation. An evanescent field from the signals (e.g., ref1 signal 158 or DUT1 signal 162) of a guided mode in the waveguide busses can overlap with a guided mode of the ring resonators, allowing optical energy to transfer between the waveguide busses and the ring resonators. The overlapping of guided modes can allow for the transfer of optical energy between the structures. In the same or other examples, the ring resonator can include grating coupling where a periodic structure or grating is present in the ring resonators. When optical energy of the signals encounter the grating they are diffracted and couple into or out of guided modes of the waveguide busses and ring resonators thereby enhancing or tuning the resolution of the ring resonator. In another example, edge coupling occurs where a facet or edge of the waveguide busses are placed close to the ring resonators. The close proximity of the facets or edges facilitate direct optical coupling of the signals between the structures. In another example, the ring resonators are silicon photonic (SiP) ring resonators. SiP ring resonators can include stacked rings to achieve various filtering effects, circular resonators, oval resonators, rectangular resonators, or resonators that are not circles. In yet another example, the waveguide busses and the ring resonators are directly coupled, that is, they physically connect to one another.

In some embodiments, the ref1 optical ring resonator 302 and the DUT1 optical ring resonator 306 have a circumference that is an integer multiple of a wavelength of the ref1 signal 158 and the DUT1 signal 162 respectively. With this design, light circulates within the ring resonator in a way that it constructively interferes with itself, forming resonant modes thereby enhancing the ring resonator's sensitivity to temperature changes. For example, when the ring resonators experience temperature changes, either from self-heating due to their input signals or due to temperature changes associated with temperature gradient regions, for example, from the adjacent heating elements, the geometry and material properties of the waveguides within the semiconductor substrate are affected. This leads to a shift in the index of refraction within the ring resonators as a function of temperature, causing resonant wavelengths to change and frequency shifting the signals within the ring resonators. As a consequence, even minor temperature variations can induce significant changes in the resonant conditions of the ring resonators which is useful for sensitive temperature detection.

As such, the ref1 optical ring resonator 302 is configured to detect a change in temperature from the ref1 heating element 109 and the DUT1 optical ring resonator 306 is configured to detect a change in temperature from the DUT1 heating element 129. For example, a frequency of the ref1 signal 158 is shifted when the ref1 heating element 109 is powered by the ref1 power source 110 relative to when the ref1 power source 110 is off. Likewise, a frequency of the DUT1 signal 162 is shifted when the DUT1 heating element 129 is powered by the DUT1 power source 130 relative to when the DUT1 power source 130 is off.

In some embodiments, the ref1 output 142 and the DUT1 output 146 are connected to a first input and a second input of a first directional coupler 312 respectively. The first input of the first directional coupler 312 can be referred to as a first coup1 input 308 and the second input of the first directional coupler 312 can be referred to as a second coup1 input 310. The first directional coupler 312 provides a first coup1 output 152 with first coup1 signal 166 and a second coup1 output 154 with second coup1 signal 168 which can connect to analysis circuitry (not pictured, e.g., analysis circuitry 172 of FIGS. 1 and 2). In other embodiments (not pictured), the ref1 output 142 and the DUT1 output 146 are connected to analysis circuitry directly. The analysis circuitry can perform calibration procedures associated with determining the calibration state of the DUT1 power source 130.

Figure 4:
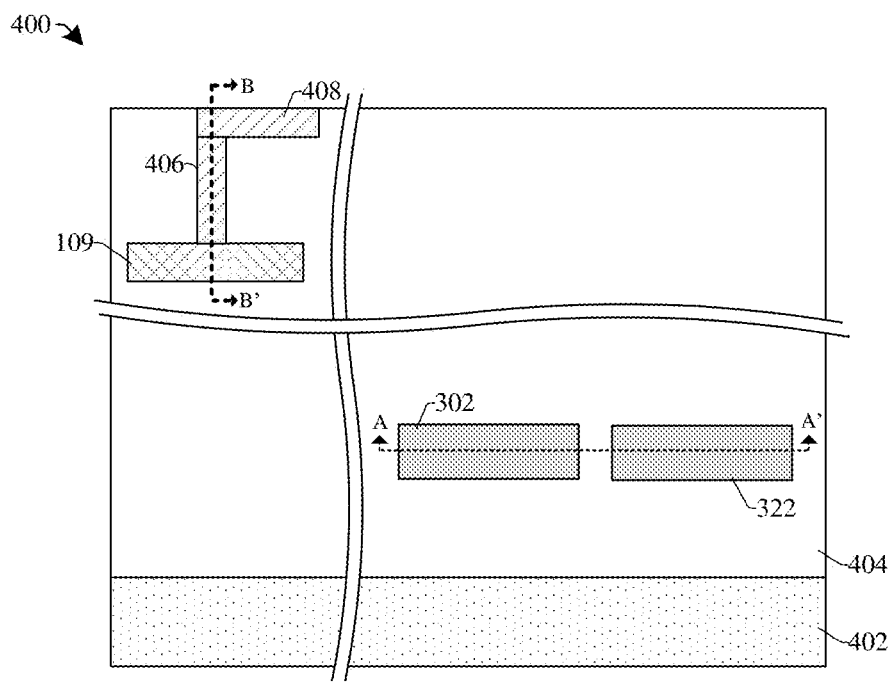
FIG. 4 illustrates a cross-sectional view of some embodiments of a circuit with an optical ring resonator and a heating element.

FIG. 4 illustrates a cross-sectional view 400 of some embodiments of a circuit with an optical ring resonator and a heating element. The cross-sectional view shows lines A-A' and B-B' of FIG. 3.

The cross-sectional view 400 includes a substrate 402 comprising a semiconductor material and an insulator 404, such as an oxide, disposed over the substrate 402. The ref1 optical ring resonator 302 is disposed within the insulator 404. The ref1 waveguide bus 322 is disposed within the insulator 404 adjacent to the ref1 optical ring resonator 302 where inner edges of the ref1 waveguide bus 322 and the ref1 optical ring resonator 302 face one another. In some embodiments, the ref1 waveguide bus 322 and the ref1 optical ring resonator 302 are formed from an insulating material. In some embodiments, the optical ring resonator 302 can be formed from silicon nitride, silicon on insulator (SOI) materials, or a low loss material that can be processed with oxide cladding. In some embodiments, the optical ring resonator 302 is formed from a material that supports a guiding mode, and or has an index of refraction of approximately 2 or greater. In some embodiments, the optical ring resonator 302 is formed from a material that has a change in refraction index per change in temperature (dn/dt) of 1e-5 per° C. or lower (i.e., refractive index changes by approximately 0.0005 for every 1° C. change in temperature at a given wavelength). In some examples, silicon nitride provides a desirable balance between optical loss and temperature response for the optical ring resonators. In some embodiments, a frequency of the ref1 signal 158 of FIG. 3 or a frequency of the DUT1 signal 162 of FIG. 3 is selected that is low loss in the present of the waveguide bus and ring resonator material, for example, C-band frequencies. However, it is understood that other frequencies for the signals can be chosen.

A portion of the ref1 heating element 109 is disposed laterally offset and adjacent to the ref1 optical ring resonator 302 and the ref1 waveguide bus 322. In some embodiments, the ref1 heating element 109 can be or comprise a resistive material or metal such as, for example, tungsten, tantalum, tantalum nitride, titanium nitride, nickel, or chromium. The ref1 heating element 109 is connected to a pad 408 by a metal interconnect 406. As such, in some embodiments, the heating elements discussed herein can be referred to as resistive elements. In some embodiments, the pad 408 and the metal interconnect 406 can be or comprise, for example, copper, aluminum, tungsten, gold, silver, palladium, or nickel. In some embodiments, the pad 408 connects to wire 108 of FIG. 3 which connects the ref1 power source 110 of FIG. 3 to the ref1 heating element 109. Aspects of the ref1 heating element 109, ref1 optical ring resonator 302, and ref1 waveguide bus 322 discussed in accordance with FIG. 4 relate also to heating elements, ring resonators, and waveguide busses discussed herein.

Figure 5:
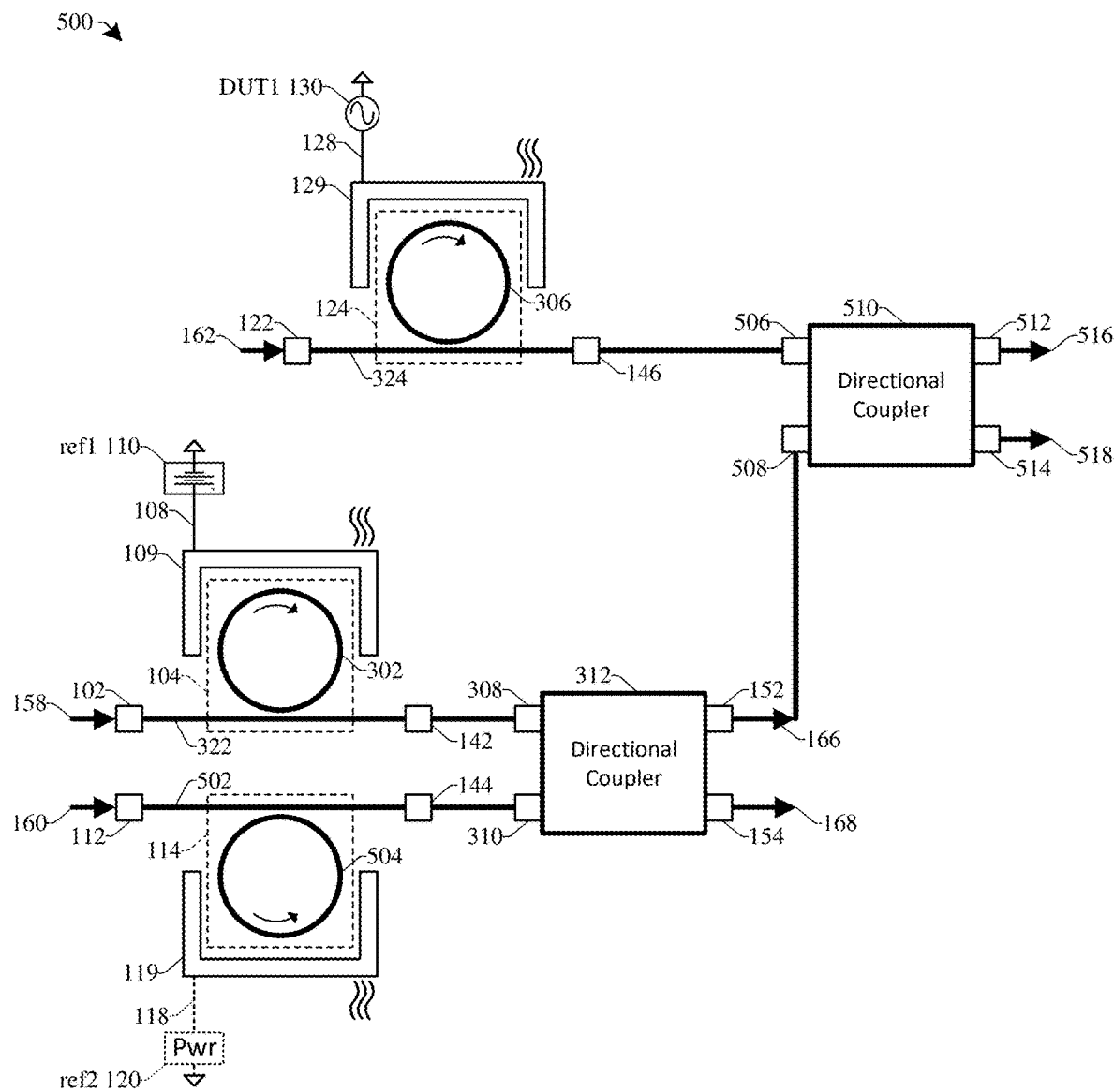
FIG. 5 illustrates a diagram of a circuit with a ref1 optical ring resonator associated with a ref1 power source, a second reference (ref2) optical ring resonator, and a DUT1 optical ring resonator associated with a DUT1 power source.

FIG. 5 illustrates a diagram of a circuit 500 with a first reference (ref1) optical ring resonator associated with a ref1 power source, a second reference (ref2) optical ring resonator, and a first device under test (DUT1) optical ring resonator associated with a DUT1 power source.

Circuit 500 shows alternative embodiments relative to circuit 300 of FIG. 3 where a ref2 optical ring resonator 504 is illustrated and the circuit 500 includes a first directional coupler 312 and a second directional coupler 510.

The ref2 optical ring resonator 504 is laterally offset from a ref2 waveguide bus 502. In some embodiments, the ref2 optical ring resonator 504 is analogous to the ref2 sensor 116 of FIG. 2. The ref2 waveguide bus 502 has a ref2 input 112 separated from a ref2 output 144 by the ref2 optical ring resonator 504. A ref2 heating element 119 is adjacent to the ref2 optical ring resonator 504. The ref2 optical ring resonator 504 is optically coupled to the ref2 waveguide bus 502. The ref2 optical ring resonator 504 receives a ref2 signal 160 by the ref2 input 112. As discussed previously, the ref2 optical ring resonator 504 can be coupled to the ref2 waveguide bus 502 through various mechanisms including evanescent coupling (e.g., SiP ring resonators), edge coupling, or direct coupling. Furthermore, the ref2 optical ring resonator 504 can have a circumference that is an integer multiple of a wavelength of the ref2 signal 160. As such, the ref2 optical ring resonator 504 is configured to detect a change in temperature from the ref2 heating element 119 within a temperature gradient region 114.

In some embodiments, a ref2 power source 120 is connected to the ref2 heating element 119 by a wire 118. The ref2 power source 120 can be an AC or a DC power source. As such, in some examples, a frequency of the ref2 signal 160 is shifted when the ref2 heating element 119 is powered by the ref2 power source 120 relative to when the ref2 power source 120 is off. In other embodiments, the ref2 power source 120 can be omitted and the ref2 optical ring resonator 504 can be used to provide a reference signal measurement of the self-heating within the ref2 temperature gradient region 114 from the ref2 signal 160 transmitted through the ref2 optical ring resonator 504.

In some embodiments, the ref1 output 142 and the ref2 output 144 are connected to a first coup1 input 308 and a second coup1 input 310 of a first directional coupler 312 respectively. The first directional coupler 312 provides first coup1 output 152 with first coup1 signal 166 and second coup1 output 154 with second coup1 signal 168. The second coup1 output 154 can be connected to analysis circuitry (not pictured, e.g., analysis circuitry 172 of FIGS. 1 and 2). The DUT1 output 146 is connected to a first second coupler (coup2) input 506 (first coup2 input 506) of a second directional coupler 510 and the first coup1 output 152 is connected to a second coup2 input 508 of the second directional coupler 510. The second directional coupler 510 has a first coup2 output 512 with a first coup2 signal 516 and a second coup2 output 514 with a second coup2 signal 518. The first coup2 signal 516 and the second coup2 signal 518 can be connected to analysis circuitry (not pictured). The analysis circuitry can perform calibration procedures associated with determining the calibration state of the DUT1 power source 130. In other embodiments (not pictured), the first directional coupler 312 and the second directional coupler 510 are omitted and the ref1 output 142, the ref2 output 144, and the DUT1 output 146 are directly connected to analysis circuitry.

In some embodiments, the ref1 optical ring resonator 302, the ref2 optical ring resonator 504, and the DUT1 optical ring resonator 306 are substantially the same geometry. In some embodiments, the ref1 heating element 109, the ref2 heating element 119, and the DUT1 heating element 129 are substantially the same geometry. By configuring the ring resonators and heating elements with the same or substantially the same geometry, the signals transmitted through the reference sensors and DUT sensor exhibit the same or substantially the same frequency shifts under the same temperature gradients. Thus, the circuit 500 can achieve accurate calibration measurement data whereby the DUT1 power source 130 can be compared to the ref1 power source 110 or the ref2 power source 120.

Figure 6:
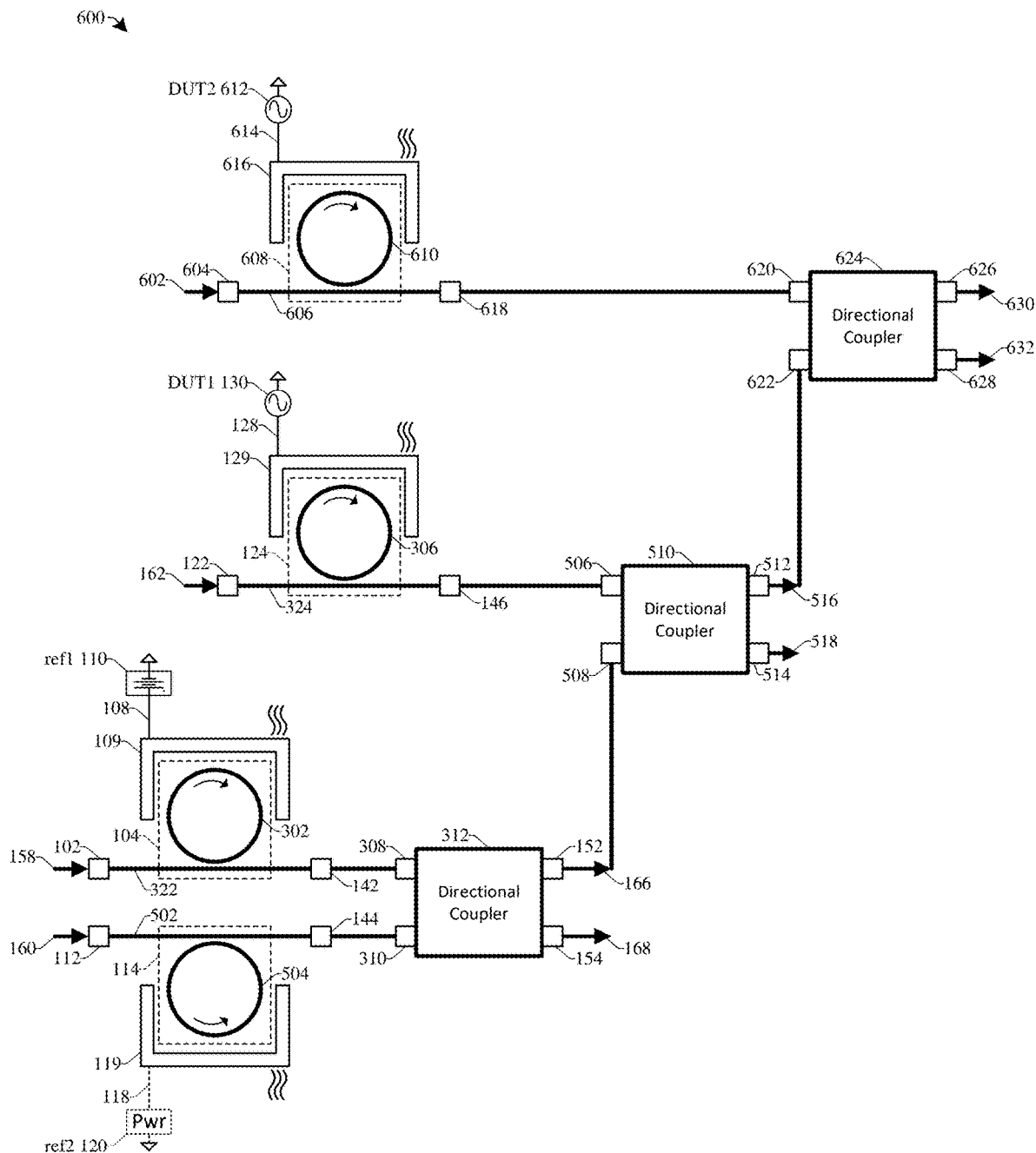
FIG. 6 illustrates a diagram of a circuit with a ref1 optical ring resonator associated with a ref1 power source, a ref2 optical ring resonator, a DUT1 optical ring resonator associated with a DUT1 power source, and a second device under test (DUT2) optical ring associated with a DUT2 power source.

FIG. 6 illustrates a diagram of a circuit 600 with a first reference (ref1) optical ring resonator associated with a ref1 power source, a second reference (ref2) optical ring resonator, a first device under test (DUT1) optical ring resonator associated with a DUT1 power source, and a second device under test (DUT2) optical ring associated with a DUT2 power source.

Circuit 600 shows alternative embodiments relative to circuit 500 of FIG. 5 where circuit 600 includes a DUT2 optical ring resonator and associated circuitry.

The circuit 600 shows a DUT2 optical ring resonator 610 that is laterally offset from a DUT2 waveguide bus 606. In some embodiments, the DUT2 optical ring resonator 610 is analogous to the DUTN sensor 136 of FIG. 2. The DUT2 waveguide bus 606 has a DUT2 input 604 separated from a DUT2 output 618 by the DUT2 optical ring resonator 610. A DUT2 heating element 616 is adjacent to the DUT2 optical ring resonator 610. The DUT2 optical ring resonator 610 is optically coupled to the DUT2 waveguide bus 606. The DUT2 optical ring resonator 610 receives a DUT2 signal 602 by the DUT2 input 604. A DUT2 power source 612 is connected to the DUT2 heating element 616 by a wire 614. The DUT2 power source 612 can be an AC or a DC power source. Thus, the DUT2 optical ring resonator 610 can detect a temperature change within a DUT2 temperature gradient region 608. For example, a frequency of the DUT2 signal 602 is shifted when the DUT2 heating element 616 is powered by the DUT2 power source 612 relative to when the DUT2 power source 612 is off.

As discussed previously, the DUT2 optical ring resonator 610 can be coupled to the DUT2 waveguide bus 606 through various mechanisms including evanescent coupling (e.g., SiP ring resonators), edge coupling, or direct coupling. Furthermore, the DUT2 optical ring resonator 610 can have a circumference that is an integer multiple of a wavelength of the DUT2 signal 602. As such, the DUT2 optical ring resonator 610 is configured to detect a change in temperature from the DUT2 heating element 616 within the DUT2 temperature gradient region 608.

In some embodiments, the circuit 600 further includes a third directional coupler 624. The DUT2 output 618 is connected to a first third directional coupler (coup3) input 620 (first coup3 input 620). The first coup2 output 512 of the second directional coupler 510 is connected to a second coup3 input 622 of the third directional coupler 624. The third directional coupler 624 provides a first coup3 output 626 with a first coup3 signal 630 and a second coup3 output 628 with a second coup3 signal 632. The first coup3 output 626 and the second coup3 output 628 can be connected to analysis circuitry (not pictured, e.g., analysis circuitry 172 of FIGS. 1 and 2). The analysis circuitry can perform calibration procedures associated with determining the calibration state of the DUT1 power source 130 and or the DUT2 power source 612. In other embodiments (not pictured), the first directional coupler 312 and the second directional coupler 510, and the third directional coupler 624 are omitted and the ref1 output 142, the ref2 output 144, the DUT1 output 146, and the DUT2 output 618 are directly connected to the analysis circuitry.

In some embodiments, the DUT2 optical ring resonator 610 has substantially a same geometry as other ring resonators of circuit 600 and the DUT2 heating element 616 has substantially a same geometry as other heating elements of circuit 600. Circuit 600 can be configured to determine electrical calibration characteristics of more than one DUT power source. Since the power sources of circuit 600 are electrically isolated from the sensors, cross-talk from the power sources within the circuit is minimal or non-existent and the circuit 600 can measure accurate and sensitive calibration measurement data.

Figure 7:
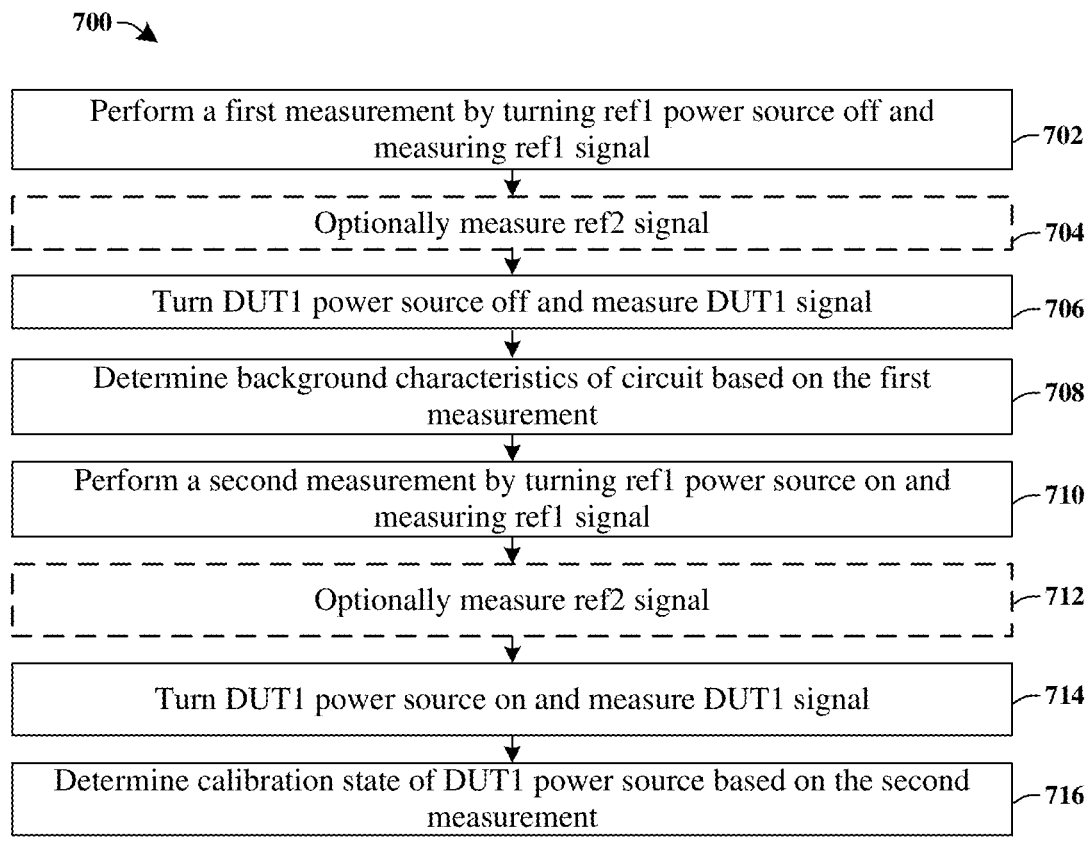
FIG. 7 illustrates a flow diagram of some embodiments of performing a calibration procedure to determine electrical characteristics of a device under test power source.

FIG. 7 illustrates a flow diagram 700 of some embodiments of performing a calibration procedure to determine electrical characteristics of a device under test (DUT) power source. While FIG. 7 is illustrated and described herein as a series of acts or events, it will be appreciated that the illustrated ordering of such acts or events are not to be interpreted in a limiting sense. For example, some acts may occur in different orders and/or concurrently with other acts or events apart from those illustrated and/or describe herein. In addition, not all illustrated acts may be required to implement one or more aspects or embodiments of the description herein. Further, one or more of the acts depicted herein may be carried out in one or more separate acts and/or phases and/or steps.

At act 702, a first measurement is performed of a ref1 signal output from a ref1 sensor. The ref1 sensor is adjacent to a ref1 heating element connected to a ref1 power source, where the ref1 power source is electrically decoupled from the ref1 sensor. The ref1 signal is measured with the ref1 power source turned off.

At act 704, optionally, the first measurement also includes measuring a ref2 signal output from a ref2 sensor. The ref2 sensor is adjacent to a ref2 heating element. If a ref2 power source is connected to the ref2 heating element, the ref2 power source is turned off.

At act 706, the first measurement also includes measuring a DUT1 signal output from a DUT1 sensor. The DUT1 sensor is adjacent to a DUT1 heating element connected to a DUT1 power source, where the DUT1 power source is electrically decoupled from the DUT1 sensor. The DUT1 signal is measured with the DUT1 power source turned off.

At act 708, the background characteristics of the circuit are determined based on the first measurement for the ref1 signal, optionally the ref2 signal, and the DUT1 signal. As such, a baseline measurement of each sensor is determined and any differences between the sensor circuit paths are determined.

At act 710, a second measurement is performed. The ref1 heating element is powered by the ref1 power source and the ref1 signal output from the ref1 sensor is measured.

At act 712, optionally, the second measurement also includes measuring the ref2 signal output from the ref2 sensor. If the ref2 power source is connected to the ref2 heating element, the ref2 power source is turned off.

At act 714, the second measurement also includes measuring the DUT1 signal output from the DUT1 sensor. The DUT1 heating element is powered by the DUT1 power source and the DUT1 signal output from the DUT1 sensor is measured.

At act 716, the calibration state of the DUT1 power source is determined. With the DUT1 power source turned on and the ref1 power source turned on, the DUT1 signal is compared to the ref1 signal to determine the calibration state of the DUT1 power source. If the DUT1 signal is the same as the ref1 signal, then the DUT1 power source is calibrated to the electrical characteristics of the ref1 power source. In some aspects, the calibration state is determined accounting for background characteristics determined at act 708.

What has been described above includes examples of one or more embodiments. It is, of course, not possible to describe every conceivable modification and alteration of the above devices or methodologies for purposes of describing the aforementioned aspects, but one of ordinary skill in the art can recognize that many further modifications and permutations of various aspects are possible. Accordingly, the described aspects are intended to embrace all such alterations, modifications, and variations that fall within the spirit and scope of the appended claims. Furthermore, to the extent that the term "includes" is used in either the details description or the claims, such term is intended to be inclusive in a manner similar to the term "comprising" as "comprising" is interpreted when employed as a transitional word in a claim. The term "consisting essentially" as used herein means the specified materials or steps and those that do not materially affect the basic and novel characteristics of the material or method. The term "essentially free" as used herein means free of or free, except for trace amounts of the specified material. The term "approximately" as used herein means the same as "about." The term "substantially" is used herein to mean minor variations may apply to the modifier "substantially" that do not materially affect the basic and novel characteristic of a particular embodiment or example. All percentages and averages are by weight unless the context indicates otherwise. If not specified above, any properties mentioned herein may be determined by applicable ASTM standards, or if an ASTM standard does not exist for the property, the most commonly used standard known by those of skill in the art may be used. The articles "a," "an," and "the," should be interpreted to mean "one or more" unless the context indicates the contrary.

It is claimed:

1. A circuit comprising:
   a first reference (ref1) sensor with a ref1 input and a ref1 output;
   a first device under test (DUT1) sensor with a DUT1 input and a DUT1 output;
   a coupler, wherein the ref1 output and the DUT1 output are connected to a first input and a second input of the coupler respectively and the coupler has a coupler output;
   a ref1 heating element adjacent to and electrically isolated from the ref1 sensor;
   a DUT1 heating element adjacent to and electrically isolated from the DUT1 sensor;
   a ref1 power source connected to the ref1 heating element; and
   a DUT1 power source connected to the DUT1 heating element.

2. The circuit of claim 1, wherein the ref1 sensor and the DUT1 sensor are electrically isolated from the ref1 power source and DUT1 power source.

3. The circuit of claim 2, wherein the ref1 heating element is thermally coupled to the ref1 sensor and the DUT1 heating element is thermally coupled to the ref1 sensor.

4. The circuit of claim 2, wherein the ref1 sensor is configured to detect a change in temperature from the ref1 heating element and the DUT1 sensor is configured to detect a change in temperature from the DUT1 heating element.

5. The circuit of claim 1, further comprising:
a second reference (ref2) sensor with a ref2 input and a ref2 output, wherein the ref2 output is connected to a third input of the coupler; and
a ref2 heating element adjacent to the ref2 sensor.

6. The circuit of claim 5, wherein the ref1 sensor, the ref2 sensor, and the DUT1 sensor are substantially thermally decoupled from one another.

7. A circuit comprising:
a first reference (ref1) optical ring resonator laterally offset from a ref1 waveguide bus wherein the ref1 waveguide bus has a ref1 input separated from a ref1 output by the ref1 optical ring resonator;
a second reference (ref2) optical ring resonator laterally offset from a ref2 waveguide bus wherein the ref2 waveguide bus has a ref2 input separated from a ref2 output by the ref2 optical ring resonator;
a ref1 heating element adjacent to the ref1 optical ring resonator;
a ref2 heating element adjacent to the ref2 optical ring resonator;
a ref1 power source connected to the ref1 heating element; and
an analysis circuitry wherein the ref1 output and the ref2 output are connected to the analysis circuitry.

8. The circuit of claim 7, wherein the ref1 optical ring resonator is optically coupled to the ref1 waveguide bus and the ref2 optical ring resonator is optically coupled to the ref2 waveguide bus.

9. The circuit of claim 7, further comprising a ref2 power source connected to the ref2 heating element.

10. The circuit of claim 7, further comprising:
a first device under test (DUT1) optical ring resonator laterally offset from a DUT1 waveguide bus wherein the DUT1 waveguide bus has a DUT1 input separated from a DUT1 output by the DUT1 optical ring resonator, wherein the DUT1 output is connected to the analysis circuitry;
a DUT1 heating element adjacent to the DUT1 optical ring resonator; and
a DUT1 power source connected to the DUT1 heating element.

11. The circuit of claim 10, further comprising a first directional coupler, wherein the ref1 output and the ref2 output are connected to a first input and a second input of the first directional coupler respectively and the first directional coupler has a first coupler output; and
a second directional coupler, wherein the DUT1 output is connected to a first input of the second directional coupler and the first coupler output is connected to a second input of the second directional coupler and the second directional coupler has a second directional coupler output connected to the analysis circuitry.

12. The circuit of claim 11, wherein the ref1 optical ring resonator receives a ref1 signal, the ref2 optical ring resonator receives a ref2 signal, and the DUT1 optical ring resonator receives a DUT1 signal;
wherein a frequency of the ref1 signal is shifted at the second directional coupler output when the ref1 heating element is powered by the ref1 power source relative to when the ref1 power source is off; and
a frequency of the DUT1 signal is shifted at the second directional coupler output when the DUT1 heating element is powered by the DUT1 power source relative to when the DUT1 power source is off.

13. The circuit of claim 11, wherein the ref1 heating element, the ref2 heating element, and the DUT1 heating element are substantially a same geometry.

14. The circuit of claim 10, wherein the ref1 optical ring resonator is configured to detect a change in temperature from the ref1 heating element and the DUT1 optical ring resonator is configured to detect a change in temperature from the DUT1 heating element.

15. The circuit of claim 10, wherein the ref1 power source is a direct current (DC) power source and the DUT1 power source is an alternating current (AC) power source.

16. The circuit of claim 10, wherein the ref1 optical ring resonator, the ref2 optical ring resonator, and the DUT1 optical ring resonator are substantially a same geometry.

17. A circuit comprising:
a first reference (ref1) sensor;
a second reference (ref2) sensor;
a first device under test (DUT1) sensor;
a ref1 resistive element surrounding a portion of the ref1 sensor;
a ref2 resistive element surrounding a portion of the ref2 sensor;
a DUT1 resistive element surrounding a portion of the DUT1 sensor;
a ref1 power source connected to the ref1 resistive element;
a DUT1 power source connected to the DUT1 resistive element; and
an analysis circuitry, wherein the ref1 sensor, ref2 sensor, and DUT1 sensor are connected to the analysis circuitry and wherein the ref1 sensor, the ref2 sensor, and the DUT1 sensor are electrically isolated from the ref1 power source and the DUT1 power source.

18. The circuit of claim 17, wherein the ref1 sensor is thermally coupled to the ref1 resistive element and the ref1 sensor is substantially thermally decoupled from the ref2 sensor, the DUT1 sensor, the ref2 resistive element, and the DUT1 resistive element.

19. The circuit of claim 17, wherein the ref1 sensor, the ref2 sensor, and the DUT1 sensor are optical or microwave sensors.

20. The circuit of claim 17, wherein the ref1 sensor, the ref2 sensor, and the DUT1 sensor are one of a ring resonator, a cavity resonator, a quantum dot, or a light source.

* * * * *